United States Patent
Rodgers

(10) Patent No.: US 8,823,522 B2
(45) Date of Patent: Sep. 2, 2014

(54) RFID TRACKING OF CHOSE IN ACTION

(76) Inventor: James Neil Rodgers, Langley (CA)

( * ) Notice: Subject to any disclaimer, the term of this patent is extended or adjusted under 35 U.S.C. 154(b) by 2382 days.

(21) Appl. No.: 11/689,316

(22) Filed: Mar. 21, 2007

(65) Prior Publication Data

US 2008/0231445 A1  Sep. 25, 2008

(51) Int. Cl.
*G08B 13/14* (2006.01)
*G06Q 10/08* (2012.01)

(52) U.S. Cl.
CPC ................... *G06Q 10/08* (2013.01)
USPC ........................................... 340/572.1

(58) Field of Classification Search
USPC ............ 235/375–385; 340/825, 2.1, 340/572.1–572.9, 10.1
See application file for complete search history.

(56) References Cited

U.S. PATENT DOCUMENTS

| | | | |
|---|---|---|---|
| 4,882,569 A * | 11/1989 | Dey | 340/572.2 |
| 6,127,928 A | 10/2000 | Issaeman et al. | |
| 6,206,292 B1 * | 3/2001 | Robertz et al. | 235/488 |
| 7,345,647 B1 * | 3/2008 | Rodenbeck | 343/895 |
| 2003/0006121 A1 * | 1/2003 | Lee et al. | 194/206 |
| 2005/0198920 A1 * | 9/2005 | Nakagawa et al. | 53/64 |
| 2006/0113671 A1 * | 6/2006 | Isa et al. | 257/758 |
| 2006/0115797 A1 * | 6/2006 | Gray | 434/110 |

* cited by examiner

*Primary Examiner* — James Yang
(74) *Attorney, Agent, or Firm* — James Neil Rodgers

(57) ABSTRACT

This invention assigns differing chose in action categories, such as banknote, check and stock certificate. Each category reflects electro magnetic signals through a nano size silicon integrated circuit package known as an RFID transponder. As an example, a unique identifier number, serial number, denomination amount, will be written onto each RFID transponder. A specific frequency can be assigned to each category. Each category is divided by at least 2 MHz with all transmissions taking place within the 24 to 40 GHz frequency range. The chose in action can be interrogated at specially shielded stations, such as cash registers or bank teller windows or at stock brokerage firms, to verify the authenticity of the chose in action. The interrogators will be connected to a centralized host system comprised of computer server and middleware to trace and track the progress of the chose in action through the economy in real time. This invention contemplates embedding the RFID nano size silicon integrated circuit package into polymer or paper based chose in action using a laminate or fiber weaving process.

9 Claims, No Drawings

RFID TRACKING OF CHOSE IN ACTION

A major problem for the Federal Reserve, central banks and those financial institutions which issue chose in action is traceability. This problem is evidenced in money laundering, counterfeiting, offshore tax fraud, illegal immigration, illegal arms trading and acts of terrorism. Chose in action as defined by this invention include, inter alia, polymer banknotes, paper banknotes, travelers checks, revenue and postage stamps, certificates, coupons and tickets of value, security inks, certificates of origin, checks, gift certificates, passports, plastic cards, stock certificates, vehicle titles, vital statistics records, insurance policies, Treasury Bills, bonds and derivative certificates or receipts. This definition includes most of the products and services provided, by way of example, by the American Banknote Company and the Canadian Banknote Company. It also includes some offerings of the U.S. Treasury Department such as postage stamps and currency.

Some of the document security services provided by the American Banknote Company which can be incorporated into any of the secure documents which they produce for clients include design, substrate of paper or plastic, inks, printing and numbering. Some of the security features offered by the American Banknote Company include watermarks, embedded fibers either visible or invisible, fluorescent inks either visible or invisible, latent images, prismatic tints and microprint.

The tracing of chose in action using RFID tags was proposed in 2002. An article in the Economist, Feb. 8, 2002 titled "Where's the Smart Money? Money of the future may almost literally talk", describes RFID tags as widgets that are used all over the world for granting access to secure areas. The article goes on to state that RFID tags are used to track anything from books to pallets to cattle to Prada handbags. The advantage is that each tag, and therefore an object associated with an individual tag, can be identified uniquely. This feature makes them different from bar codes which merely identify classes of object. Furthermore, RFID tags can be read remotely without having to be in the line of sight of the interrogator as bar codes require. RFID device manufacturers have been keen to involve their product in tagging banknotes. The advantages of this tagging system proposed by the proponents include authentication, anti-counterfeiting and tracking.

A typical RFID system works with a microchip and an attached antenna. The antenna is often a coil of wire. The microchip and coil of wire may be sandwiched inside an encapsulating plastic. Normally the tag is interrogated by a reading machine operating at a predetermined radio frequency. The job of the antenna is to harvest a small amount of the electro magnetic signal transmitted by the interrogator. This signaled electro magnetic energy is used to power the chip. The information on the chip is then broadcast back to the interrogator through the antenna, using the power of the interrogator to reflect back or backscatter the data.

In 2002 there was a new generation of RFID tags produced by companies such as Texas Instruments, Hitachi and Infineon Technologies which are less than 1 mm across and one half mm thick. These RFID tags exhibit the characteristics of cost, flexibility, durability and size to the critical point where they can be embed inside sheets of paper, for example, banknotes. The problem with these potential solutions which are part of the prior art is that although the chip will embed inside a sheet of paper the antenna will not.

This invention contemplates that RFID tagged chose in action are capable of providing current information as to inventories of, for example, notes within banks. Furthermore, if cash registers were equipped with authorized interrogators then details of a transaction and the chose in action involved could be collated in a central database. Authorized interrogators would involve prompt and response split algorithms to verify the authenticity of the chose in action. It is proposed that knowledge and monitoring of banknotes could be a very useful tool. For example, mining data which pinpoints how different banknotes move through an economy would make it easy to spot suspicious transactions. If a large deposit of banknotes appears at a bank, yet have been out of circulation for years, an alert would be triggered. There are also uses for law enforcement in terms of tracking the "informal economy" to locate where banknotes turn up. These RFID tag tracking interventions into chose in action will illicit huge privacy concerns. For example, users of illicit goods such as recreational drugs and prostitution will risk losing their anonymity. However, the counter arguments of the threat of terrorism and organized crime will likely prevail in favor of implementing a tracking and tracing technology. Furthermore, kidnappers will no longer be able to demand "unmarked bills" as all chose in action will be traceable.

Up until recently, the price of RFID tracking has not been financially feasible due to the high cost of the RFID tag. Primarily, the cost is in the metal material and labor unit cost which goes into the antenna which is externally attached to the silicon chip. Only the highest denomination of chose in action would warrant the cost. Even then, the chips were not flexible or robust enough to endure the normal everyday wear and tear of chose in action.

Tagged chose in action will require much better technology and design. For example, in 2003 Hitachi launched their "MU' chip which is only 0.4 millimeters square and 0.1 millimeters thick. This chip can allow the RFID tags to be read from a few millimeters away. This MU chip allows banks and retail outlets to verify banknotes without letting skimming technology spy on the contents of a customer's wallet. The challenge with the MU chip is embedding the hard silicon device in a banknote. The chip must be accompanied by a flexible antenna, which may have to be inches long. This is not feasible for chose in action.

During February of 2007 Hitachi released an RFID chip which measures 0.05 millimeters by 0.05 millimeters. This is in contrast to their 2003 MU chip which was much larger. In fact, the current Hitachi chips are sixty times smaller than the MU chip. These new chips are the size of dust or powder and can be easily used in paper currency or gift certificates. The 2007 version Hitachi chip have a 128-bit ROM for storing a unique 38 digit number. Hitachi used miniaturization technology and electron beams to write data on the chip substrates. This is the breakthrough which allows the nano size of the Hitachi chips. The deficiency with this piece of prior art is that it requires an external antenna to communicate its data. On this basis, as a standalone, the Hitachi chip is deficient for embedding into chose in action. The external antenna would be large, unwieldy and totally unsuitable for chose in action.

The invention which is the subject of this Application follows on from two previous Rodgers' Applications which contribute, through better technology and design, to a significant decrease in the costs of RFID antennas and thus are an enabler to the widespread application of RFID to the traceability of chose in action. Furthermore, these two previous Applications significantly reduce the cost, weight and size of RFID antennas. There is application Ser. No. 11/683,056 titled, "RFID silicon antenna" filed Mar. 7, 2007 which describes a system of producing an RFID antenna using the silicon in an integrated circuit as the resonant antenna material for the purpose of reducing the cost of an RFID system and for the purpose of increasing the range and selectivity of the RFID system. According to this Rodgers Application the base silicon sheets which make up the primary building material of the silicon chip (integrated circuit) is subjected to a laser ablation process. This creates three dimensional nano structures on the surface of the silicon thereby raising its absorption rate of electro magnetic signals. On the reverse side of the same silicon sheet a directional antenna is etched using standard photographic reduction techniques and standard semi conductor industry manufacturing methods. The two sides of the silicon are connected through doping aluminum or copper impurities into these same base silicon sheets causing conductivity within the sheet of silicon.

Furthermore, there is application Ser. No. 11/686,946 titled "Precisely tuned RFID antenna" filed Mar. 15, 2007 which describes an RFID antenna manufacturing system whereby the RFID antenna becomes an integral part of an integrated circuit package. The RFID manufacturing system contemplated by this Application includes photoresist manufacturing techniques to produce a template or die specifically designed to mass produce RFID transponders whereby the chip and antenna becomes one integrated unit. The RFID antenna template or die is precisely tuned, using trimming algorithms and laser technology, to resonate with electro magnetic signal increments of 2 megahertz in the 24 to 40 GHz frequency range. According to this system each increment is assigned to a different category in a supply chain. This invention reduces the cost, size and weight of prior art RFID transponders. The key inventive step in these two Rodgers' Applications as they apply to the present invention is that the antenna of the RFID transponder is part and parcel of the chip and the same size as the chip. It is not external as all antennas are required to be as stipulated in the previous and prior art. This reduces size, weight and cost. Furthermore, each antenna can be precisely tuned to a specific frequency for each category of chose in action within the 24 to 40 GHz frequency range.

BACKGROUND OF THE INVENTION

The inventor is aware of no prior art which contemplates a nano silicon antenna which is integral to and makes up a system on a chip package which can be embedded into chose in action for the purpose of tracking or tracing.

However, there are some patents which should be discussed.

U.S. Pat. No. 6,127,928 issued Oct. 3, 2000 to Issaeman, et al. describes a document tracking system using RFID. The inventive step in this system is a two frequency exciter design. This invention does not contemplate a nano silicon antenna which is integral to and makes up a system on a chip package which can be embedded into chose in action for the purpose of tracking or tracing.

U.S. Patent Application 20030006121 by Lee et al. describes a passive radio frequency identification system for identifying and tracking currency. The inventive device in this Application is a paper like passive RFID transponder which could be embedded in a currency containing encrypted electronic bits of data such as a serial number or currency amount. The system also contemplates a transceiver for wireless interrogation of the transponder and a back end management system. The deficiency with this Application is that the Claims do not outline how this paper like passive RFID transponder will be embedded or how it is manufactured. This is in stark contrast to the present invention.

SUMMARY OF THE INVENTION

Polymer banknotes were developed by the Reserve Bank of Australia and were first issued as currency in 1988. They are made from the polymer biaxially-oriented polypropylene. This substrate enhances the durability of the banknotes. An alternative developed by DuPont is known as Tyvek. It is made of a polymer of polyethylene fibers. This was adopted for use by the American Bank Note Company. Polymer banknotes incorporate many security features not available to paper banknotes. Polymer allows for security features such as a transparent window and diffraction grating. The transparent window houses the Optically Variable Device (OVD), created from diffraction gratings in plastic, as a key security feature of the polymer banknote. The OVD is easily identifiable and allows anyone to authenticate a banknote. The polymer process is easily adaptable to the present invention as the patented formula dictates a process of lamination in order to combine materials. In other words, more than one layer is applied to the polymer banknote. This is a process analogous to the layers of silicon added to a silicon wafer during the integrated circuit manufacturing process. Accordingly, it would be a simple manufacturing process to add the nano RFID integrated circuit package between layers of ink as they are applied to each banknote or any chose in action manufactured using the polymer patent.

There is also the traditional paper based chose in action manufacturing procedure. The American Banknote Company embeds fibers, visible and invisible, into its products during the paper manufacturing process. Therefore, it would be a simple process to embed the integrated circuit package contemplated herein with the fiber embedding procedure used by The American Banknote Company.

The useful, non-obvious and novel step of this invention is to embed an integrated circuit package, comprised of a nano silicon RFID transponder chip and antenna, into selected chose in action, using a lamination or fiber weaving process, for the purpose of tracing or tracking the chose in action.

PREFERRED EMBODIMENT

The preferred embodiment is to segregate the chose in action for tracing or tracking and manufacture a nano silicon integrated circuit using Rodgers application Ser. No. 11/683, 056 titled, "RFID silicon antenna" filed Mar. 7, 2007, as follows: Irradiate silicon surfaces with blasts of ultra short laser pulses to change the physical properties of the silicon. The concept is to create a forest of microscopic spikes on the surface of bulk commercial silicon. The surface of silicon is usually smooth and highly reflective. The physical alteration to the surface of the silicon using laser pulses causes it to be highly absorptive of electro magnetic radiation. This Application contemplates treating commercial sheets of silicon wafers with laser ablation for the purpose of changing the physical properties of the silicon so that the silicon acts as an antenna. In so doing the cost of producing an RFID transponder is significantly reduced as the antenna and integrated circuit can be manufactured as one piece.

For example, one aspect of this Application is to take ordinary commercially produced silicon wafer sheets, and subject these sheets to an intense blast of laser light. The result is a silicon structure which is usually smooth and reflective presenting with pits, globules and strands. This physical transformation dramatically increases the reflective area of the surface of the silicon wafer sheets suffering laser ablation. This has the effect of dramatically improving the ability of the silicon to capture or harvest radiation.

The laser blast or ablation causes nanostructures to form on the silicon. These nanostructures are the result of changes to the physical properties of the silicon. These changes increase the ability of the silicon to harvest or capture radiation. The more surface area available on the silicon the more surface area is available for the radiation in the form of electro magnetic signals to be absorbed into. The science in this area indicates that laser blackening of silicon increases absorption rates by at least 50%.

The process is known as a femtosecond laser pulse. The laser burst lasts only a few quadrillionths of a second. For the purposes of comparison, a femtosecond is to a second what a second is to about 32 million years. By way of further comparison during this brief burst the laser unleashes as much power as the entire grid of North America onto a spot the size of a needle point.

This Application uses three dimensional nano structuring caused by femtosecond laser pulses to increase the radioactive sensitivity of a sheet of silicon wafers designed for an RFID system whereby the silicon acts as both the microprocessor and the antenna. It is contemplated that commercial sheets of silicon wafers will be treated with femtosecond laser pulses to increase their radiation absorption rate and therefore increase their sensitivity to electro magnetic signals. The absorption rate is equivalent to the degree to which electro magnetic energy, or radiation, is captured or harvested by base antenna material.

The scientific research supports a model whereby the laser ablation process blackens the surface of silicon using a TI: Sapphire Femto-Second laser to increase electro magnetic absorption rates. Reflectance measurements are made to analyze the surface properties of the silicon wafer sheets to determine the parameters of the reflectance values. Standard scientific measuring processes are used to make this determination. Furthermore, the scientific journals reveal precise laser pulse durations to confine collateral damage on the surface of the silicon and disclose that technologies of the nonlinear multi photon laser matter interaction processes are required for proper laser ablation. The laser blast should be at a frequency equivalent to the surface charge oscillations of the silicon and can be manipulated in duration and number of laser pulses to incrementally raise absorption rates. This laser ablation process creates nano cavities, nano rims and nano protrusions on the silicon.

In a preferred embodiment of this Application the silicon wafers used for constructing the integrated circuits used in an RFID system is purchased in bulk sheets. The manufacturer of the RFID silicon wafers could use a generic laser pulse device to ablate the surface of the silicon sheets with a femtosecond of laser energy. The silicon wafers would then be used in the manufacture of an RFID integrated circuit which would not need a metal or reflective ink antenna. The antenna would be the outside edge of the silicon.

Silicon chips are small rectangle of silicon. They are usually 4 or 5 square centimeters in area. The silicon acts as a base, or substrate, upon which the chip is built. It also plays a part in the electrical operation of the device. The chip is made up of a number of layers of pure and impure silicon which are built up on one side of the silicon rectangle. The lower layers interact to form the active components which are usually transistors. The upper layers are usually wires and are known as passive components.

Pure silicon is an insulator. In the wafer manufacturing process impurities are added to silicon during a layering process. This process is known as doping. The impurities which are added increase the number of free charge carriers or charged particles that are free to move about within the silicon. The result is that the silicon becomes progressively more electrically conductive as more impurity is added; Hence the name semi conductor. The type of impurity added affects the type of charge carrier. For example, some impurities generate free electrons which are negative charge carriers. This type of silicon is known as n-Type. They are others which generate holes or space where electrons should be.

These particle spaces behave as positive charge carriers and are known as p-Type. The current silicon manufacturing process uses technology referred to as "complementary metal oxide semiconductor", also know as CMOS. During the CMOS process the embedded regions of the transistor form the source and drain for electron movement. The surface layers of the silicon wafer contain diffuse ions. These regions are often made from a mixture of silicon and metal. The metal has lower resistance allowing signals to travel faster. The insulator plate which goes between the silicon and the conducting plate is made of silicon oxide, also known as glass. The conducting plate or gate itself is poly crystalline silicon or "poly". This part of the silicon is without a uniform crystal structure and can be distinguished from the silicon substrate on which the chip is placed.

The typical manufacturing process for silicon chips is to add layer upon layer of silicon with each layer comprising differing levels of electrical conductivity or circuit complexity. There are more electrically active layers which form the transistors. There are electrically passive components, for example wires, which connect transistors together. These differing layers are separated from each other by silicon oxide. Holes are made in the silicon oxide to make connections between the various layers. Furthermore, there are many wiring layers in modern chips. Traditionally, the metal used for wiring is aluminum or copper.

One of the key tools for integrated circuit manufacture is laser light. This is because lasers provide a key enabling technology for the semiconductor industry. They are used to inspect and repair the mask and wafer. Nanosecond and femtosecond diode pumped solid state lasers at 355 nm and 266 nm are used to inspect the circuits. They use repair tools which are designed to correct feature defects in the chrome absorber or quartz transmissive mask substrate patterns.

The mask (circuit) pattern is applied onto the silicon substrate layer by layer. The mask is made up of circuit features spun unto the surface of a polished silicon wafer. In layman's terms, a very complicated circuitry is drawn at a very large macro level (room size) so that minute detail can be designed into an electronic circuit. This circuit is then photographed. The photograph, instead of being enlarged as is the normal in photography, is reduced in size. It is reduced to the size of the end of a pin needle. This reduced photograph is then photo exposed on a thin layer of photosensitive polymer which becomes part of the silicon mask. In more technical language the photolithographic detailed circuit is de-magnified replicating all features of the circuit perfectly. This is then made into a master stencil mask. It is illuminated in transmission by an ultraviolet light source. There is then a complex method of developing the de-magnified photograph through a process of photoresist, stripping, etching, ion implantation and deposition. After that, photo type exposures are repeated with different mask patterns as complex chip circuitry is built up, layer by layer, on the silicon wafers. The manufacturing process achieves size reduction in the photolithography mask imaging process by a combination of reducing the wavelength of the exposure source, increasing the resolution of the magnifying lens and using phase shifting masks. Furthermore, corrective structures to the mask features can be added and the photosensitive response of the resist can be tailored.

This Application contemplates taking the technology that is currently in use in the semiconductor industry and utilizing it to construct a complex directional antenna for RFID purposes. The nano antenna, when designed, would be photographed, reduced in size, and through a process of photolithography, well known to the industry, plus deposition, etching and stripping, then this nano antenna would be introduced onto a silicon wafer. This wafer would be the reverse side of a wafer which would have been treated by the femtosecond laser so that three dimensional nano structures on its surface would make it highly radiative.

The present invention would also utilize Rodgers application Ser. No. 11/686,946 titled "Precisely tuned RFID antenna" filed Mar. 15, 2007 to lever the technology that is currently in use and well known in the semiconductor industry to construct a precisely tuned antenna for RFID transponder purposes.

The novelty in designing a precisely tuned antenna into a nano size is not so much in the manufacture but more in the propitious use of shorter electro magnetic signal wavelengths. These shorter wavelengths emanate from higher frequency electro magnetic signals. However, high frequency electro magnetic signals have a problem; they propagate poorly. Gigahertz level signals do not travel far as they are weakened by anything between the transmitter and receiver. This can include air. For example, the oxygen in the air resonates and strongly absorbs signals at about 60 gigahertz. However, in the 24 to 40 gigahertz range warehouse size transmission is not problematic.

The key utility of this Application is to reduce the cost of the most expensive add on feature to any RFID system. That is the antenna. Prior art antenna design stipulates that the antenna must be built and connected to the integrated circuits as an add on unit. This add on design requires wires and connectors and hands or machines to hook everything together. The integrated on chip antenna contemplated by this invention as an integrated package requires no external antenna, no wires and no expensive connectors.

Connections within the chip are accomplished through the aluminum and copper impurities introduced into the base silicon layer materials. The assembly is complete as a fully functioning integrated unit as soon as the integrated circuit leaves the chip foundry. The cost is only marginally higher than the integrated circuit as a stand alone as it involves the application of only one additional layer of silicon.

This Application proposes trimming the length of a very small antenna to correlate with a correspondingly high frequency range, for example, in the 24 gigahertz frequency range. The shorter wavelengths of these higher frequency signals allow for a smaller antenna which will still resonate with the interrogating electro magnetic signal. For example, the 24 Gigahertz range is 10 times faster than the frequency used by a home computer or a micro wave oven. Although gigahertz signals do not propagate well there are opportunities for propagation. For example, gigahertz electro magnetic signals propagate efficiently in smaller, defined environments such as within a warehouse or distribution center.

This Application piggy backs on the current trend in the semiconductor industry towards System on Chip (SoC) and System on Package (SoP) concepts. These concepts refer to putting all items necessary for chip operation within the chip itself. This invention relates to the RFID industry in particular and its requirements for a miniature antenna to form an integral part of the transponder item found in a complete RFID system. Through integration of the antenna, processors, memories, logic gates and biasing circuitry into a single semiconductor chip, the manufacturing process outlined herein details commercial transponder advantages of size, weight and cost. In other words, by manufacturing the antenna as part of the chip and not by attaching an external antenna, the cost decreases as does the size and weight of the RFID transponder.

Furthermore, the Application borrows from Gen 2 cellular telephony designs by incorporating a frequency division concept into this novel RFID transponder formula. By way of explanation, the 2G cellular system of frequency division multiple access (FDMA) separates the cellular spectrum into hundreds of distinct voice channels. For example, this is accomplished by splitting the federally assigned bandwidth into distinct and uniform chunks of bandwidth. This is analogous to several radio stations within a large city. Each station broadcasts on its own distinct frequency within an assigned FCC band range. In the FDMA system each telephone call is separated by 45 MHz. Therefore, one call would transmit at 893.7 MHz and another at 824.04 MHz so that the two calls do not offend each other by broadcasting on identical frequencies. Likewise, this Application proposes that each category of articles to be traced by the RFID system have transponders embedded or attached to them which broadcast at frequencies which are 2 MHz apart.

The different broadcasting frequencies would be a function of antenna tuning. This tuning would be accomplished by precisely designing each resonant sub frequency into an antenna template. This template would be photo reduced and etched unto a silicon substrate. The transponder antenna template would be tested and then the template would be trimmed to perfection using laser technology. It is contemplated by this invention that the first transponder as manufactured in bulk from the initial template will resonate at 24 GHz as so tuned during the manufacturing process. As an example, this transponder would be assigned to the category "banknotes"; a second set of transponders would be manufactured using the identical semiconductor type manufacturing process to resonate at 24.002 GHz. This would be assigned the category "checks"; then a third set of transponders would be manufactured using the identical semiconductor process to resonate at 24.004 GHz. This would be assigned the category "stock certificates" in an economy, and so forth. The increment is by 2 MHz, the amount which was found to be scientifically replicable. Therefore, there are thousands of 2 MHz increments between 24 GHz and 40 GHz available for assignment to different categories in an economy where this RFID Application is used as a proprietary system.

As the antenna is manufactured into the chip, the entire package is exponentially smaller than any currently produced RFID transponder. The current RFID industry standard transponder usually has an external antenna attached to the chip. Pursuant to this Application the antenna is miniaturized using standard integrated circuit manufacturing techniques. However, the smaller antenna dictates that the transponder operate at a much higher frequency. This is because as the antenna gets smaller the wavelength that it can resonate with also gets smaller. As the frequency increases the wavelength decreases. Precisely tuning the antenna is done in the template design stage. Each template is designed so that each antenna produced will resonate with one exact frequency. This template is then photo reduced. The photo reduction is then made into a mask. This mask is fabricated unto a silicon layer which is laid upon the silicon substrate. Then another template is made designed to resonate at exactly 2 MHz distance apart from the first template, and so on. Each template produces a test batch of antennas which are examined with a laser and trimmed to perfection. The template is then re designed to match the trimmed antenna. According to this Application a batch of unlimited number of precisely tuned nano antennas can be manufactured from one template and, by using economies of scale, cost decreases will result due to volume production.

According to the present invention, differing chose in action categories, such as banknote, check and stock certificate, can be arbitrarily assigned to a unique frequency in the GHz range. This specific frequency so assigned to each category will distinguish each category with increments of 2 MHz all within the 24 to 40 GHz frequency range. The chose in action can be interrogated at specially shielded stations, such as cash registers or bank teller windows or at stock brokerage firms, to verify the authenticity of the chose in action as each individual chose in action within a category will possess a unique identifier number. The interrogators will be connected to a host system comprised of computer server and middleware to trace and track the progress of the chose in action through the economy.

Specifically, the designers of a system using the present invention will designate certain choke points as areas of ingress and egress; into and out of any given economy. For example, the Treasury Department may use this invention by embedding new currency with the nano silicon chip and then interrogate same with a reader programmed to initiate the RFID transponders on each bill. This would be the point of ingress. This initiating information, such as serial number and denomination, would be read from a stack of bills set for delivery to a banking institution. This information would be shunted by secure means of communication to a computer system owned and operated by the Treasury Department. The computer system would associate the initiating information, such as serial number, denomination and destination point, with a unique identifier number located on the RFID transponder embedded within each bill. The back end management system would generate a random number for the bill upon ingress. This information would be stored in a databank located within the back end computer management system owned and operated by the Treasury Department. The point of egress in this example would be the point at which a teller at a banking institution presents bills to customers. The information on each bill so presented would be scanned by an interrogator programmed to read the information contained on the RFID transponder embedded into each bill. This information would then be fed back to the computer management system of the Treasury Department for confirmation of the random number. This information would prove receipt and distribution of the bill by the banking institution. Similarly, a computer management system owned and operated by the banking institution could account for all cash distributed to its customers.

Another example of ingress and egress would be the reverse of the above example when, for example, bills of currency are deposited into a banking institution by a customer. The computer system of the banking institution would account for who deposited the bills as the teller is automatically forced to scan the bills so deposited with an interrogator located at the teller wicket. The interrogator would be formed as a portal for the bills to pass through at the teller wicket and would be scanned upon presentation by the customer to the teller. The scanned information would be forwarded to the Treasury Department for confirmation of the random number. These deposited bills would be forwarded to the Treasury Department for destruction or re-issuance. Upon the bills arriving at the Treasury Department they would be scanned by an interrogator which could be located at the warehouse door at the receiving facility owned and operated by the Treasury Department. This interrogator would take the form of a portal so that no bill could be received without being automatically scanned. The scanned data would be directed to the back end computer management system owned and operated by the Treasury Department for reconciliation with the initiating data obtained from the bills upon initial ingress into the U.S. economy.

Furthermore, this system could be expanded to all financial institutions worldwide so that all offshore financial institutions would automatically report egress of currency from the system upon deposit into any particular offshore financial system. In other words, terrorists and smugglers of contraband could no longer hide behind the secrecy laws of offshore jurisdictions. The U.S. currency is owned by the Treasury Department which has the authority to monitor the whereabouts and status of their property, the legal tender. The interrogators used in this invention would need to be shielded from skimming and the portals protected from unwanted dissemination of GHz frequencies. The skimming problem will be the subject of a follow on patent involving an encryption program utilizing an algorithm split three ways between the bill, the ingress point and the egress point. For example, a handshake between the bill and the initiating point of ingress generates a random number associated with the bill which is stored in the backend computer system of the Treasury Department. This number would be required to match with the particular bill being traced before it was allowed to egress the economy. In other words, a counterfeiter or forger could not get the currency out of the economy without knowing the random number which is owned and controlled by the Treasury Department. The unwanted GHz dissemination problem is curtailed by enclosing the interrogating portals enunciated herein with covers of electro magnetic absorptive materials, available on the commercial market, such as rubber, to absorb any unnecessary electro magnetic signals which are backscattered to the interrogator. The implementation of this procedure obviates any problems with federal frequency regulation guidelines or with frequency pollution or signal to noise issues.

All ingress and egress movements contemplated in this invention can be reported in real time to the backend computer management system of any initiating institution. For example, a transfer agent for a publicly traded company would initiate stock certificates in the method described above. The random number would be generated immediately in the back end management computer. Therefore, immediately upon initiation, the particular stock certificate being issued could not be accepted out of the system without the random number, known only to the transfer agent.

What is claimed is:

1. A method of tracking and tracing chose in action throughout an economy using an RFID nano size silicon integrated circuit package known as an RFID transponder, the method comprising: selecting a chose in action from the group comprising polymer banknotes, paper banknotes, travelers checks, revenue and postage stamps, certificates, coupons and tickets of value, security inks, certificates of origin, checks, gift certificates, passports, plastic cards, stock certificates, vehicles titles, vital records, insurance policies; selecting an RFID nano size silicon integrated circuit package with fully housed silicon antenna the whole known as an RFID transponder; assigning a specific frequency for each category of chose in action to be tracked or traced and tuning the RFID transponder antenna contained within the nano size silicon integrated circuit package to a specific assigned category of chose in action at 2 MH intervals in the 24 to 40 GHz frequency range; embedding the said integrated circuit package constructed of nano size silicon into chose in action and whereby a laminate process is used to embed into polymer substrate chose in action and further a weaving fiber process is used to embed into chose in action comprised on a paper substrate; providing real time information regarding current levels of inventory of tracked or traced chose in action to a centralized database; providing RFID transponder interrogators at key transit points, including check out and cash register points in a retail environment, teller windows at banking institutions, back end cage offices at stock brokerage firms; providing means of collecting and collating the interrogated RFID data of the movement of chose in action via middleware into a central processing database.

2. The method of claim 1 whereby date obtained from the RFID transponders is directed to a centralized data collection point, including a computer server, middleware, software and a host system for the purposes of mining the data obtained in real time in order to assist in the tracing and tracking of chose in action.

3. The method of claim 1 whereby strategic points are located in the economy which is the subject of tracing and tracking which strategic points are designated ingress and egress points by designers of the specific RFID system in use.

4. The method of claim 3 whereby shielded interrogators are installed at the designated strategic points which are designed and programmed to read the electro magnetic signal emanating from the RFID transponders embedded in the chose in action.

5. The method of claim 4 whereby the electro magnetic signals harvested from the RFID transponders are directed to a specifically designed back end computer network built for the purposes of providing real time date for the instantaneous tracing and tracking of chose in action.

6. The method of claim 1 to embed the nano size silicon integrated circuit package onto a polymer substrate through the process of lamination of layers where at least one of the layers contains the nano size silicon integrated circuit package.

7. The method of claim 1 to embed the nano size silicon integrated circuit package onto a paper substrate through the process of fiber weaving where the nano size silicon integrated circuit package is woven directly into the paper substrate.

8. The method of claim 1 whereby a frequency division process is utilized to designate each category of chose in action as a unique category at 2 MHz intervals in the 24 to 40 GHz frequency range.

9. A method of tracking and tracing chose in action throughout an economy using an RFID nano size silicon integrated circuit package known as an RFID transponder, the method comprising: selecting a chose in action from the group comprising polymer banknotes, paper banknotes, travelers checks, revenue and postage stamps, certificates, coupons and tickets of value, security inks, certificates of origin, checks, gift certificates, passports, plastic cards, stock certificates, vehicles titles, vital records, insurance policies; selecting an RFID nano size silicon integrated circuit package with fully housed silicon antenna the whole known as an RFID transponder; assigning a specific frequency for each category of chose in action to be tracked or traced and tuning the RFID transponder antenna contained within the nano size silicon integrated circuit package to a specific assigned category of chose in action at 2 MH intervals in the 24 to 40 GHz frequency range and whereby a frequency division process is utilized to designate category of chose in action as a unique category; embedding the said integrated circuit package constructed on nano size silicon into chose in action and whereby a laminate process is used to embed into polymer substrate chose in action is through the process of lamination of layers where at least one of the layers contains the nano size silicon integrated circuit package and further a weaving fiber process is used to embed into chose in action comprised on a paper substrate and whereby the nano size silicon integrated circuit package is woven directly into the paper substrate; providing real time information regarding current levels of inventory of tracked or traced chose in action to a centralized database; providing RFID transponder interrogators at key transit points, including check out and cash register points in a retail environment, teller windows at banking institutions, back end cage offices at stock brokerage firms; providing means of collecting and collating the interrogated RFID data of the movement of chose in action via middleware into a central processing database and whereby the electro magnetic signals harvested from the RFID transponders are directed to a specifically designed back end computer network built for the purposes of providing real time data for the instantaneous tracing and tracking of chose in action; providing RFID transponder interrogators at key transit points including check out and cash register points in a retail environment, teller windows at banking institutions, back end cage offices at stock brokerage firms; providing means of collecting and collating the interrogated RFID data of the movement of chose in action via middleware into a central processing database.

* * * * *